(12) United States Patent
Zodnik

(10) Patent No.: US 6,580,602 B2
(45) Date of Patent: Jun. 17, 2003

(54) COMPUTER IN A WALL

(75) Inventor: Richard Zodnik, San Juan Capistrano, CA (US)

(73) Assignee: Accelerated Performance Inc., San Juan Capistrano, CA (US)

( * ) Notice: Subject to any disclaimer, the term of this patent is extended or adjusted under 35 U.S.C. 154(b) by 0 days.

(21) Appl. No.: 09/461,710

(22) Filed: Dec. 14, 1999

(65) Prior Publication Data

US 2002/0126443 A1 Sep. 12, 2002

Related U.S. Application Data

(60) Provisional application No. 60/141,473, filed on Jun. 29, 1999.

(51) Int. Cl.[7] .................................................. G06F 1/16
(52) U.S. Cl. ........................ 361/683; 361/686; 312/242; 248/123.1
(58) Field of Search ............................ 361/679, 686; 341/20, 22; 345/169, 126; 312/223.2, 2.2, 245, 242; 364/708.1; 353/122; 248/123.1, 125, 284, 585, 587, 638, 917; 348/739, 825, 836, 843

(56) References Cited

U.S. PATENT DOCUMENTS

| | | | | | |
|---|---|---|---|---|---|
| 4,562,482 | A | * | 12/1985 | Brown | 358/254 |
| 5,002,184 | A | * | 3/1991 | Lloyd | 206/305 |
| 5,108,063 | A | * | 4/1992 | Koerber, Sr. et al. | 248/284 |
| 5,909,934 | A | * | 6/1999 | McGraw | 312/223.3 |
| 5,986,634 | A | * | 11/1999 | Alioshin et al. | 345/126 |
| 6,128,186 | A | * | 10/2000 | Feierbach | 361/683 |
| 6,184,804 | B1 | * | 2/2001 | Harrison | 341/22 |
| 2001/0043290 | A1 | * | 11/2001 | Yamamoto | 348/836 |

* cited by examiner

*Primary Examiner*—Darren Schuberg
*Assistant Examiner*—Yean-Hsi Chang
(74) *Attorney, Agent, or Firm*—Irell & Manella, LLP

(57) ABSTRACT

A computer assembly that is configured as a wall. The computer includes a processor that is located within an inner cavity of a frame. The frame may be covered with a fabric and have a dimensional aspect ratio that simulates a wall. A video screen may be coupled to the frame. A bracket or other fastening system may be employed to mount the frame to another structure such as a wall, or a piece of furniture.

1 Claim, 6 Drawing Sheets

COMPUTER IN A WALL

The application claims benefit of provisional application No. 60/141,473 filed Jun. 29, 1999

BACKGROUND OF THE INVENTION

1. Field of the Invention

The present invention relates to a computer that is configured as a wall or a panel.

2. Background Information

Personal computers are typically packaged as a metal chassis that contains a microprocessor, memory devices, etc. A video monitor, keyboard, mouse, etc. may be connected to the chassis by external wires and electrical connectors. In an office environment the video monitor is located on a working surface such as a desk or cubicle. The chassis may be either on top, or below, the working surface. The video monitor and chassis occupy valuable workspace that increase the size of the working surface. The additional workspace required for the chassis and video monitor can increase the floor space of the office. The larger floor space increases the leasing cost of the office, particularly large areas with a plurality of cubicles.

The wires connecting the chassis to the peripheral devices are typically routed behind the desk to reduce clutter and improve the appearance of the office. Connecting the wires can be a difficult and time-consuming task. Additionally, the wires and corresponding connectors limit the arrangement of the computer. For example, the backside of a computer monitor is not typically directed toward guest chairs in an office. It would be desirable to provide a computer system that was easy to install and occupied a minimal amount of workspace. It would also be desirable to provide a system that was ergonomic and allowed the user to adjust features such as the height of the video screen.

SUMMARY OF THE INVENTION

One embodiment of the present invention may be a computer assembly that is configured as a wall. The computer includes a processor that is located within an inner cavity of a frame. The frame may be covered with a fabric and have a dimensional aspect ratio that simulates a wall. A video screen may be coupled to the frame.

BRIEF DESCRIPTION OF THE DRAWINGS

FIG. 3 is a bottom view of the computer assembly of FIG. 1;

FIG. 7 is a rear perspective view showing an alternate mounting assembly of a computer assembly;

FIG. 8 is a rear perspective view showing an alternate mounting assembly of a computer assembly;

DETAILED DESCRIPTION

Figure 1:
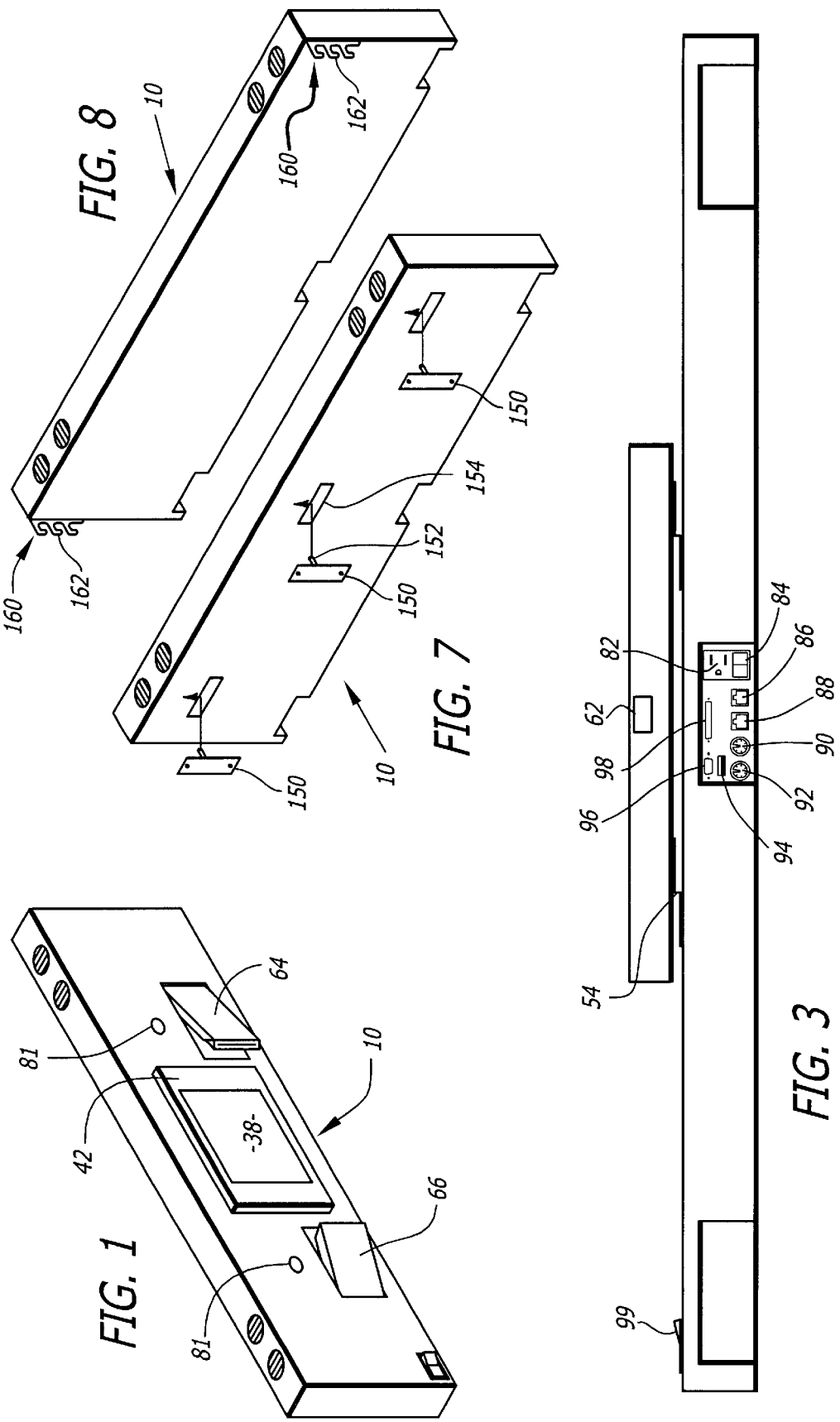
FIG. 1 is a front perspective view of a computer assembly of the present invention.
Figure 2:
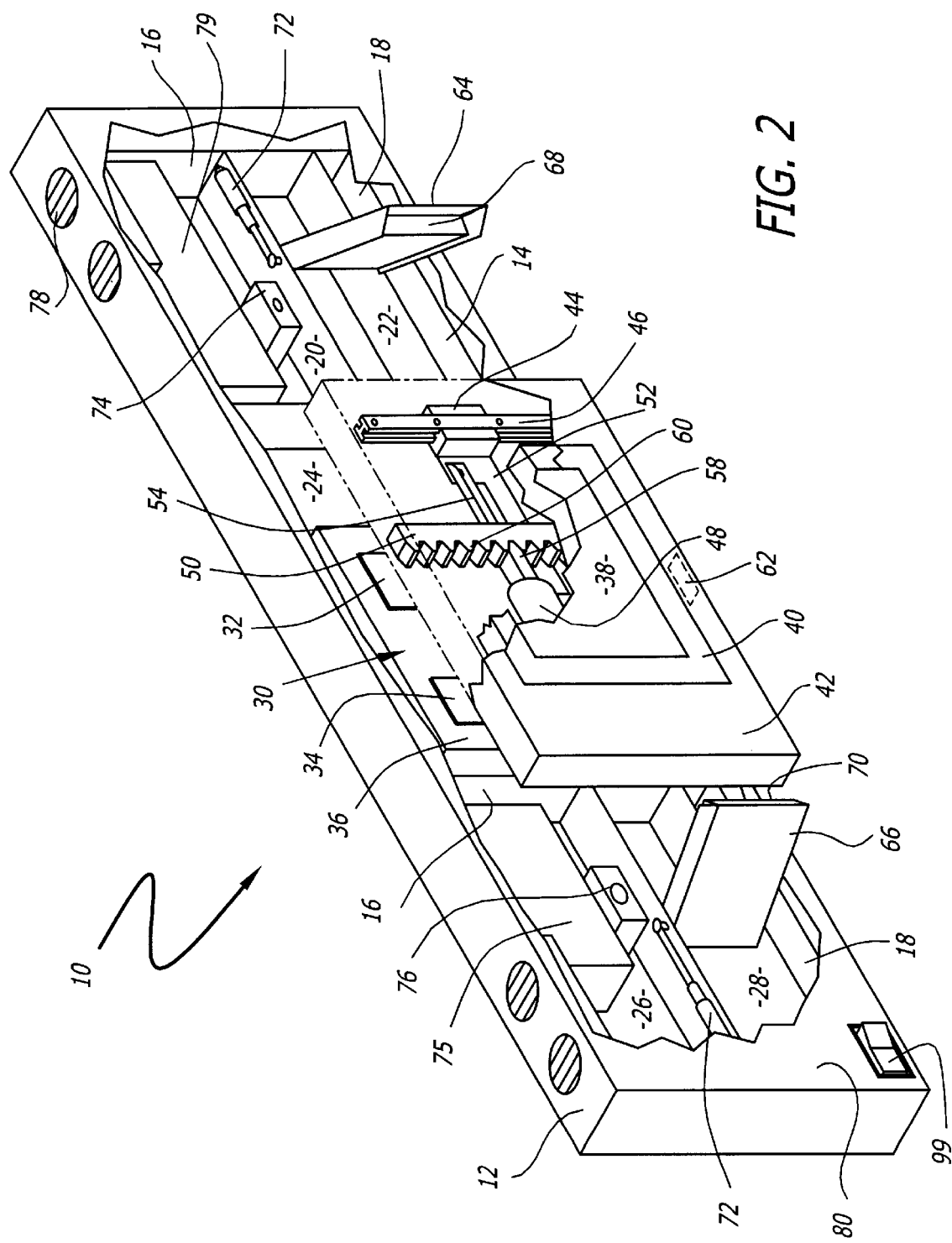
FIG. 2 is sectional perspective view of the computer assembly of FIG. 1.

Referring to the drawings more particularly by reference numbers, FIGS. 1 and 2 show an embodiment of a computer assembly 10 of the present invention. The assembly 10 may include a frame 12 that has an inner cavity 14. The frame 12 may be constructed from a material such as metal or plastic. The frame 12 may include a plurality of vertical walls 16 and horizontal walls 18 that define a number of individual compartments 20, 22, 24, 26 and 28.

Compartment 24 may include a printed circuit board assembly 30 commonly referred to as a motherboard. The assembly 30 may include a microprocessor 32, a memory device(s) 34 and other circuits (not shown) that are mounted to a printed circuit board 36. The printed circuit board 36 is fastened or otherwise secured to the frame 12.

The computer system 10 may include a video screen 38 that is coupled to the frame 12 and the circuit board assembly 30. The video screen 38 is preferably a flat panel display or other device that has a low profile. The screen 38 may be attached to a bezel 40 that is pressed into an outer case 42. The bezel 40 may be pulled out of the case 42 so that the screen 38 can be replaced with another unit. The bezel 40 may have different sizes to accommodate different types of screens. For example, the screen 38 may be 15, 17 or 18 inches.

The case 42 may be attached to a pair of vertical guide blocks 44 that slide along vertical guide rails 46. The guide rails 46 are attached to the frame 12. The blocks 44 and rails 46 allow an end user to vertically adjust the position of the screen 38. The screen 38 can be locked in place by a solenoid 48 that cooperates with a locator bar 50. The locator 50 may be mounted to the frame 12. The solenoid 48 can be mounted to a slide plate 52 that is attached to the guide blocks 44. The assembly 10 may include a torque hinge 54 that allows an end user to adjust the angle of the screen 38.

The solenoid 48 may have a plunger 58 that engages teeth 60 of the locator bar 50. The solenoid 48 may be connected to a button 62 mounted to the case 42. The end user can depress the button 62 SO that the plunger 58 is disengaged from the locator bar 50. The user can then adjust the vertical position of the screen 38. The screen 38 is locked in place by releasing the button 62 so that the plunger 58 again engages the locator bar 50.

The computer assembly 10 may include a pair of drawers 64 and 66 that are pivotally connected to the frame 12. The first drawer 64 may include a detachable hard disk drive 68. The second drawer 66 may contain a detachable compact disc or floppy disk drive 70. The drawers 64 and 66 can be rotated between a closed position which conceals the drives 68 and 70, and an open position that provides access to the drives 68 and 70.

The drawers 64 and 66 may each have an electrical connector (not shown) that allows the drives 68 or 70 to be coupled to, and detached from, the assembly 10. The connectors may be connected to the printed circuit board assembly 30 by wires (not shown) within the frame 12. Each drawer 64 and 66 may also have guide rails (not shown) and other features that align and detachably secure the drives 68 and 70.

Each drawer 64 and 66 may be connected to a gas spring 72 that is mounted to the frame 12. The drawers 64 and 66 can be secured in a closed position by a magnetic latch (not shown). The drive drawers 64 and 66 can be moved to an open position by initially pushing the drawers inward to disengage the magnetic latches. The gas springs 72 will then exert a spring force that rotates the drawers 64 and 66 to the open position so that the end user can access the drives 68 and 70. Although a passive system is shown and described, it is to be understood that the drawers 64 and 66 can be connected to an active system to conceal and provide access to the drives.

The assembly 10 may include a wireless detector 74 that is mounted to the frame 12 and coupled to the printed circuit board assembly 30. By way of example, the wireless detector 74 may be an infrared detector. The wireless detector 74 may receive signals from a remote device such as a keyboard or a mouse. Providing a wireless interconnect eliminates routing wires between the remote devices and the assembly 10. The elimination of wires reduces office clutter and allows a device such as a keyboard to be placed at a location that is not immediately adjacent to the computer as required in wired systems.

The assembly 10 may include a modem, a facsimile, or a modem/facsimile board 75 that is coupled to the printed circuit board assembly 30 and secured to the frame 12. The board 75 may provide functions to transmit and receive information through phone lines as is known in the art.

The computer assembly 10 may also have a camera 76 that is mounted to the frame 12 and coupled to the printed circuit board assembly 30. The camera 76 allows video conferencing with the computer assembly 10.

The computer assembly 10 may have a plurality of fans 78 that are attached to the frame 10 and remove heat generated by the various electrical components of the assembly 10. The assembly 10 may also contain a power supply 79 that is connected to the printed circuit board assembly 30 and other electrical components.

The frame 12 may be covered with a fabric 80 so that the assembly 10 has the appearance of a wall or a panel. The fabric 80 may be a woven material typically used as wallpaper for a wall or the outer material of a panel found in furniture, particularly office cubicles. The fabric 80 may be attached to the frame 12 in panels that can be easily removed to provide access to the inner cavity 14 of the frame 12. The outside surface of the drawers 64 and 66 may also be covered with the fabric material. As shown in FIG. 1, the fabric 80 may have optical windows 81 aligned with the detector 74 and camera 76. Alternatively, the covered areas may be powder coated.

The dimensional aspect ratio of the frame 12 may be such that the assembly more approximates a wall or panel. By way of example, the height of the frame 12 may be no less than 4 times the thickness of the assembly 10. The length of the frame 12 may be no less than 7.5 times the thickness of the assembly 10.

As shown in FIG. 3, the computer assembly 10 may have a plurality of electrical connectors 82, 84, 86, 88, 90, 92, 94, 96 and 98 that are coupled to the electrical components of the assembly 10. Connector 82 may be a power receptacle, connector 84 may be a breaker switch. Connectors 86 and 88 may be RJ-11 phone jacks for dedicated phone lines utilized for network, modem, etc. Connectors 90 and 92 may be serial and parallel ports for the computer 10. Connectors 94 and 96 may be 9 and 25 pin connectors, respectively. Connector 98 may be a USB receptacle. As shown in FIG. 2, the assembly 10 may also have an "on/off" switch 99 located on the front surface for easy access by the end user.

Figure 4:
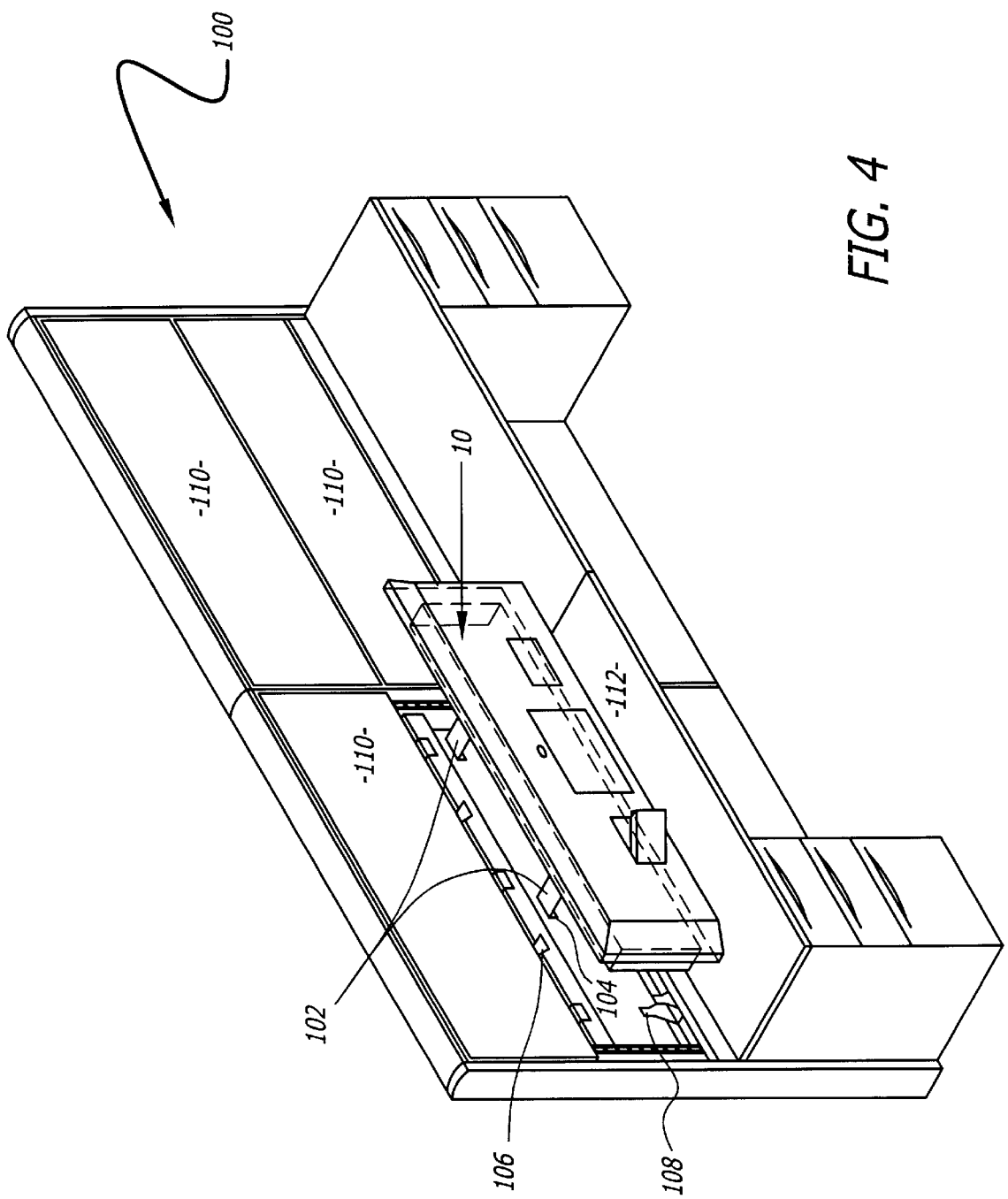
FIG. 4 is an exploded front perspective view showing a mounting assembly that couples a computer assembly mounted to a desk.

FIG. 4 shows a computer assembly 10 that can be mounted to a desk 100. The assembly 10 may include a pair of brackets 102 that are mounted to the assembly 10. The brackets 102 may have U-shaped end portions 104 that can clip onto a frame 106 of the desk 100. The frame 106 may include a pair of C-shaped brackets 108 that can receive corresponding features of the assembly 10 to secure the lower portion of the computer 10. The assembly 10 may be constructed to have the same appearance as other panels 110 of the desk 100. Integrating the assembly 10 with the other panels 110 increases the amount of working space on the desktop 112.

The computer 10 can be assembled by first attaching all of the external wires into the connectors 82, 84, 86, 88, 90, 92, 94, 96 and 98. The bottom edge of the assembly 10 can be placed into the brackets 108 and the computer 10 can then be rotated until the brackets 102 snap onto the frame 106. An existing panel 110 is typically removed from the desk 100 before assembly of the computer 10.

Figure 5:
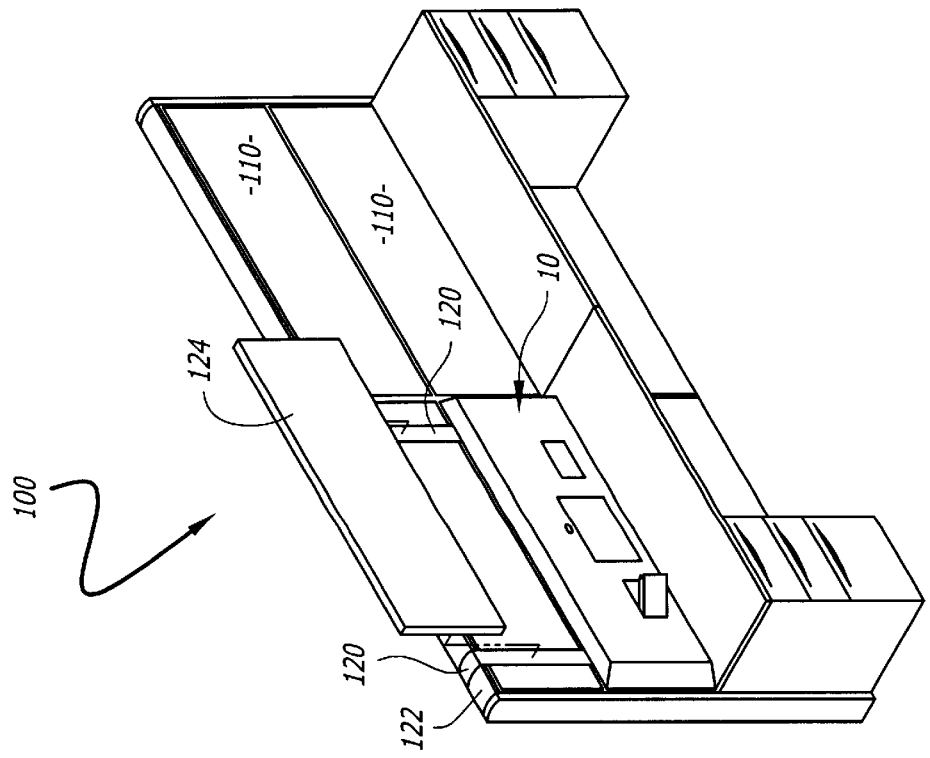
FIG. 5 is an exploded front perspective view showing an alternate embodiment of a mounting assembly that couples a computer assembly to a desk.

FIG. 5 shows another embodiment of brackets 120 that allow the computer 10 to be suspended from a top edge 122 of the desk 100. This embodiment allows the computer 10 to be mounted to the desk 100 without removing a desk panel 110. The brackets 120 may be concealed with a secondary panel 124.

Figure 6:
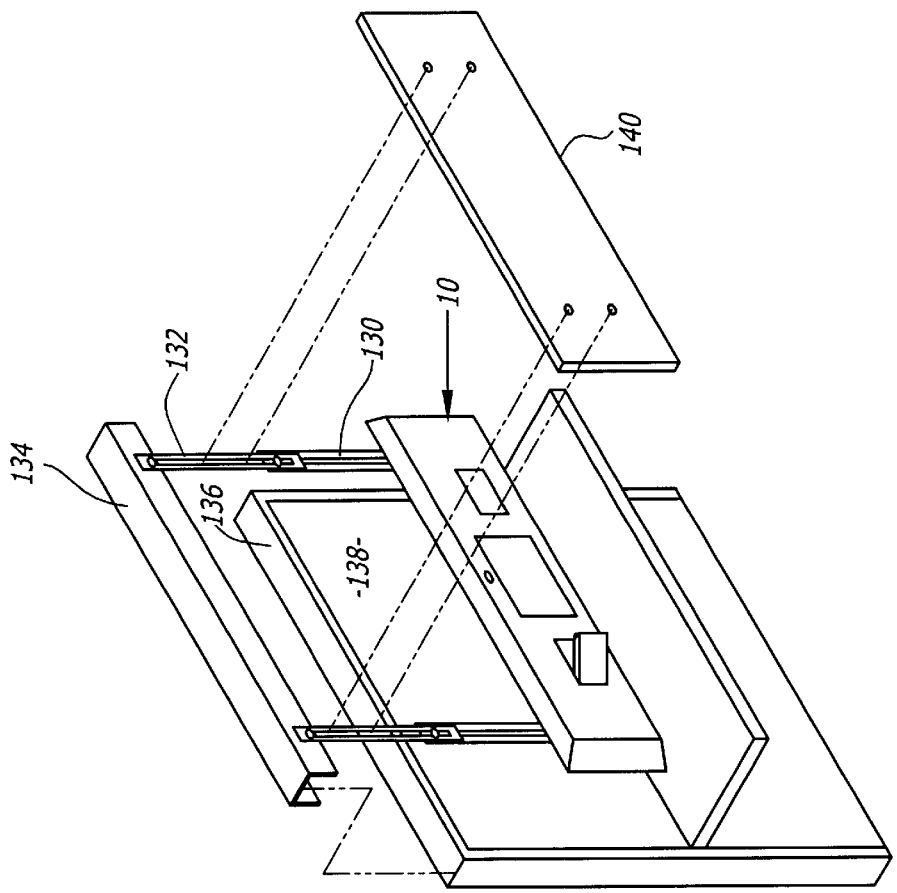
FIG. 6 is an exploded front perspective view showing an alternate embodiment of a mounting assembly that couples a computer assembly to a desk.

FIG. 6 shows another embodiment wherein the computer 10 is attached to a plurality of adjustable slide plates 130 and 132. The top plates 132 can be connected to a bracket 134 that is placed onto a top edge 136 of a wall 138. A panel 140 can be installed to conceal the plates 130 and 132. The height of the computer 10 can be varied relative to the wall 138 by adjusting the slide plates 130 and 132.

FIG. 7 shows an embodiment having a plurality of mounting brackets 150 that can couple the computer 10 to a structure (not shown). The brackets 150 may have pins 152 that extend into corresponding slots 154 of the computer 10.

FIG. 8 shows an embodiment having a pair of brackets 160 that can couple the computer 10 to a structure (not shown). Each bracket 160 may have a plurality of spring fingers 162 that can exert a corresponding spring force on the structure and secure the computer 10.

Figure 9:
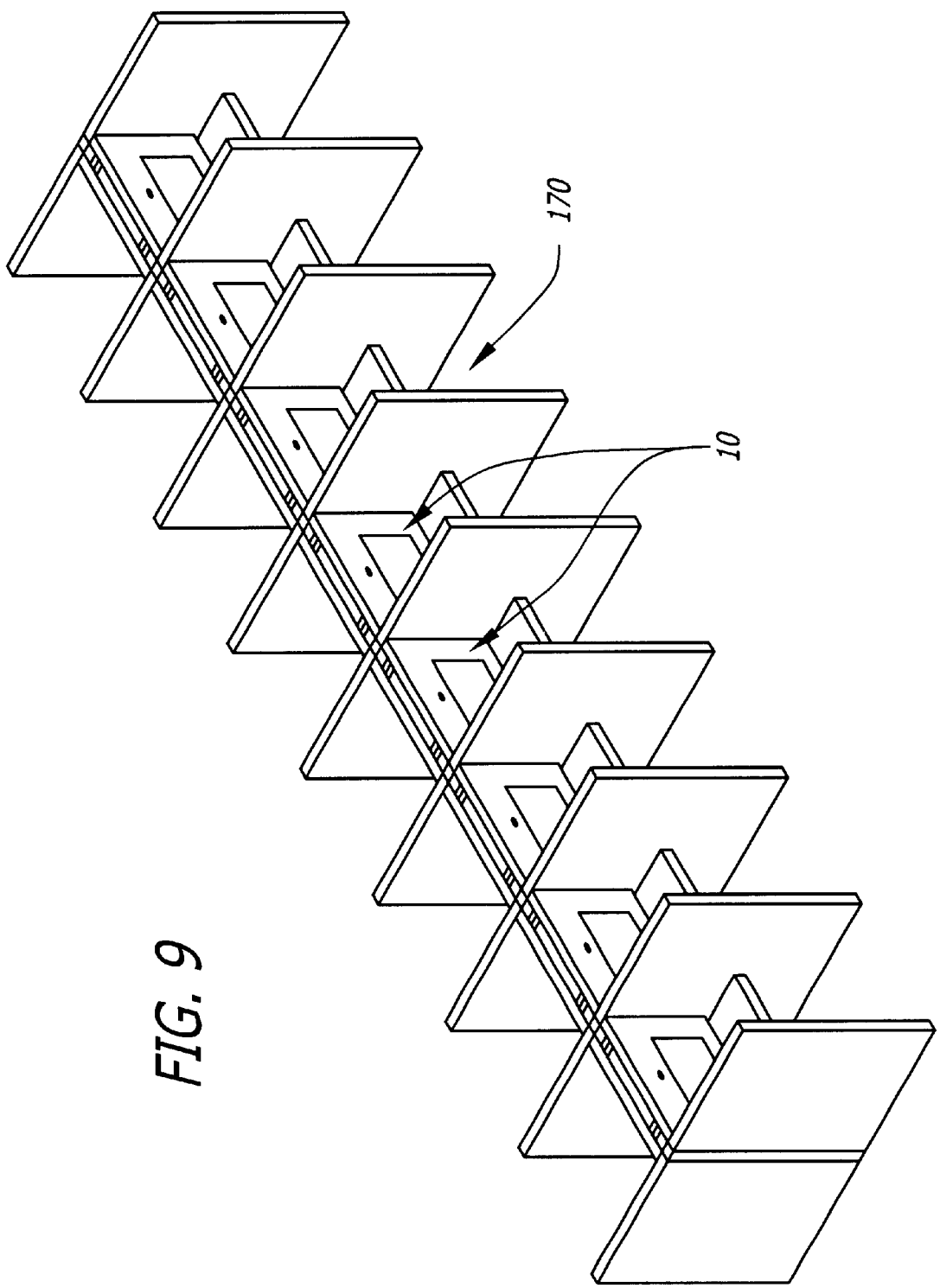
FIG. 9 is a top perspective view showing a plurality of cubicles that each have a computer assembly.

FIG. 9 shows a plurality of computers 10 that are each located within a cubicle 170. Configuring the computer as a wall reduces the amount of space required for each cubicle 170. Reducing the size of each cubicle 170 lowers the space requirements for all of the cubicles 170. Lowering the space requirements can lower the cost of staffing the personnel that reside at the cubicles 170.

Figure 10:
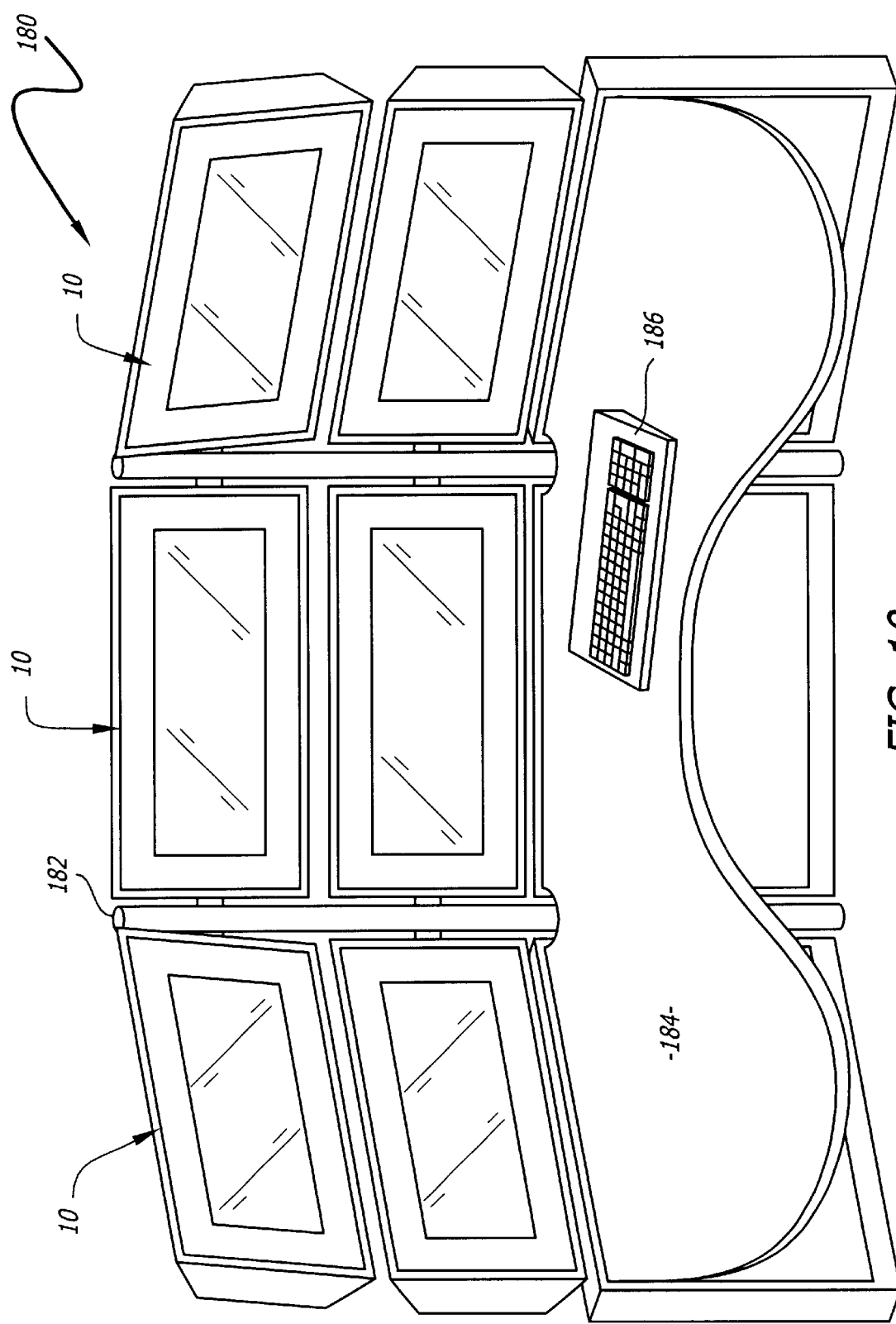
FIG. 10 is a front perspective view of a workstation that includes a plurality of computer assemblies.

FIG. 10 shows a workstation 180 that has a plurality of computers 10. Each computer 10 can be pivotally mounted to a workstation frame 182. The workstation frame 182 can be attached to a desktop 184. The workstations 182 can be connected by wires (not shown) that extend through the frame 182. The computers 10 can be coupled to a wireless keyboard 186.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A computer assembly comprising:
    a frame that has an inner cavity;
    a processor located within said inner cavity;
    a video screen mounted to said frame; and,
    an adjustment mechanism that follows said video screen to move relative to said frame and locks a position of said video screen, said adjustment includes a solenoid that is coupled to said video screen, said solenoid having a plunger that is coupled to a locator which is mounted to said frame.

* * * * *